United States Patent
Park et al.

(10) Patent No.: US 9,833,749 B2
(45) Date of Patent: Dec. 5, 2017

(54) COMPOSITE SEPARATION MEMBRANE INCLUDING COATING LAYER OF GRAPHENE OXIDE/BILE ACID OR SALT THEREOF AND METHOD FOR MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Ho Bum Park, Seoul (KR); Hyo Won Kim, Seoul (KR); Hee Wook Yoon, Gyeonggi-do (KR); Byung Min Yoo, Gyeonggi-do (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 235 days.

(21) Appl. No.: 14/785,474

(22) PCT Filed: Sep. 27, 2013

(86) PCT No.: PCT/KR2013/008697
§ 371 (c)(1),
(2) Date: Oct. 19, 2015

(87) PCT Pub. No.: WO2014/171599
PCT Pub. Date: Oct. 23, 2014

(65) Prior Publication Data
US 2016/0051942 A1    Feb. 25, 2016

(30) Foreign Application Priority Data
Sep. 20, 2013   (KR) .................. 10-2013-0042268

(51) Int. Cl.
*B01D 53/22*   (2006.01)
*B01D 71/02*   (2006.01)
(Continued)

(52) U.S. Cl.
CPC ......... *B01D 71/024* (2013.01); *B01D 53/228* (2013.01); *B01D 67/0079* (2013.01);
(Continued)

(58) Field of Classification Search
CPC .. B01D 53/22; B01D 71/024; B01D 2256/16; B01D 2256/12; B01D 71/021; Y02C 10/10; B05D 1/005; B05D 53/228
See application file for complete search history.

(56) References Cited

U.S. PATENT DOCUMENTS 8,148,161 B2    4/2012  Higgins et al.
9,393,396 B2 *  7/2016  Peyman
(Continued)

FOREIGN PATENT DOCUMENTS

KR    1020110033111    3/2011
KR    1020090104622    10/2012
(Continued)

OTHER PUBLICATIONS

Kim, S., et al., "Polysulfene and functionalized carbon nanotube mixed matrix membranes for gas separation: Theory and experiemnt," Journal of Membrane Science, 2007, vol. 294, pp. 147-158.
(Continued)

*Primary Examiner* — Anthony Shumate
(74) *Attorney, Agent, or Firm* — Duane Morris LLP; J. Rodman Steele, Jr.; Gregory M. Lefkowitz

(57) ABSTRACT

The present invention relates to a composite separation membrane that is applicable to carbon dioxide separation and recovery processes. The composite separation mem-
(Continued)

brane includes a coating layer composed of graphene oxide and a bile acid or its salt on a porous polymer support. The composite separation membrane of the present invention, which includes a coating layer composed of graphene oxide and a bile acid or its salt, has both high carbon dioxide permeability and high selectivity for carbon dioxide over nitrogen, hydrogen or methane gas, is free of surface defects, and maintains a stable structure without deterioration of its performance even after long-term use. Due to these advantages, the composite separation membrane of the present invention can be applied to industrial fields involving carbon dioxide separation and recovery processes. The present invention also relates to a method for manufacturing the composite separation membrane.

22 Claims, 6 Drawing Sheets

(51) Int. Cl.
B01D 69/12 (2006.01)
B01D 67/00 (2006.01)
B05D 1/00 (2006.01)

(52) U.S. Cl.
CPC ............. *B01D 69/12* (2013.01); *B01D 71/02* (2013.01); *B01D 71/021* (2013.01); *B05D 1/005* (2013.01); *B01D 2256/10* (2013.01); *B01D 2256/12* (2013.01); *B01D 2256/16* (2013.01); *B01D 2256/245* (2013.01); *B01D 2257/504* (2013.01); *Y02C 10/10* (2013.01)

(56) References Cited

U.S. PATENT DOCUMENTS

| | | | | |
|---|---|---|---|---|
| 9,434,926 B1* | 9/2016 | Mohapatra | ............ | C12N 5/0663 |
| 9,718,972 B2* | 8/2017 | Torrisi | ................... | C09D 11/02 |
| 2008/0233438 A1* | 9/2008 | Yagi | ........................ | C10L 3/108 |
| | | | | 429/476 |
| 2011/0037033 A1* | 2/2011 | Green | ...................... | B03D 3/00 |
| | | | | 252/510 |
| 2012/0171150 A1* | 7/2012 | Metelits | ............... | A61K 31/695 |
| | | | | 424/78.01 |
| 2012/0214172 A1* | 8/2012 | Chen | ...................... | B82Y 15/00 |
| | | | | 435/6.19 |
| 2012/0255899 A1 | 10/2012 | Choi et al. | | |
| 2013/0015409 A1* | 1/2013 | Fugetsu | ................. | B82Y 30/00 |
| | | | | 252/500 |
| 2013/0197256 A1* | 8/2013 | Wu | ........................ | B82Y 40/00 |
| | | | | 558/56 |
| 2013/0230496 A1* | 9/2013 | Mohapatra | ............. | A61K 47/36 |
| | | | | 424/93.7 |
| 2015/0031014 A1* | 1/2015 | Lu | ..................... | G01N 33/54306 |
| | | | | 435/5 |
| 2015/0283482 A1* | 10/2015 | Hersam et al. | ........ | B01D 21/26 |
| | | | | 494/37 |
| 2016/0022976 A1* | 1/2016 | Peyman | ............... | A61K 9/5169 |
| | | | | 600/439 |
| 2016/0038605 A1* | 2/2016 | Lam | ................... | A61K 49/0423 |
| | | | | 424/1.45 |
| 2016/0355401 A1* | 12/2016 | Suh | ...................... | C01B 31/0484 |
| 2017/0027168 A1* | 2/2017 | Heath | ..................... | A01N 25/30 |

FOREIGN PATENT DOCUMENTS

| | | |
|---|---|---|
| KR | 1020120115821 | 10/2012 |
| KR | 1020120140214 | 12/2012 |
| WO | 2011066332 | 6/2011 |

OTHER PUBLICATIONS

Byungkook, A.'s dissertation thesis statement entitled "Preparation and Characterization of Ultrathin Membrane Derived from Graphene Oxide", Hangyang University, Dec. 7, 2011.

\* cited by examiner

[Fig. 1]
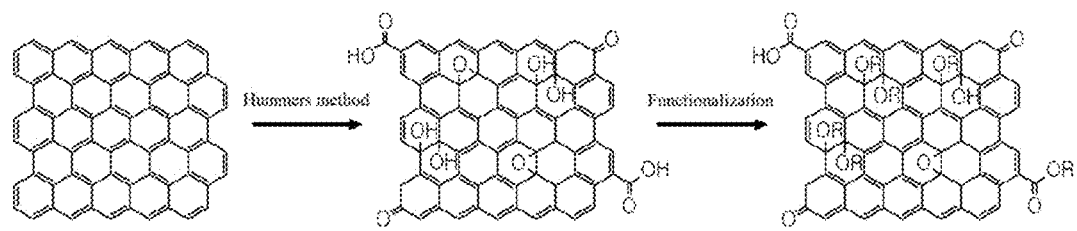
[Fig. 2]
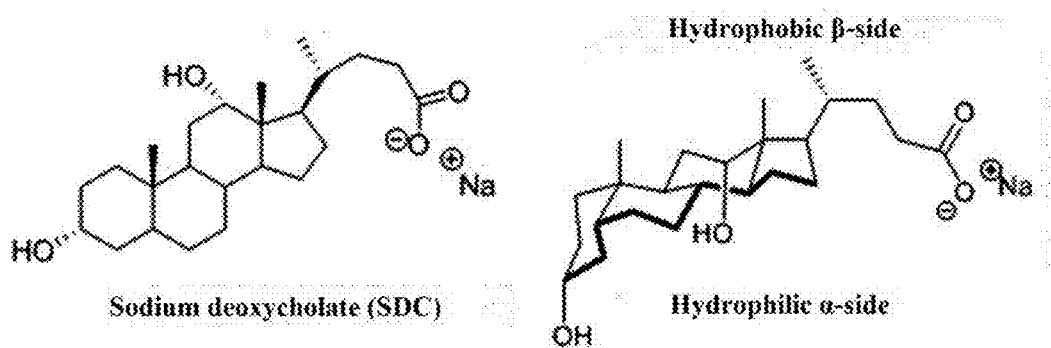
[Fig. 3]
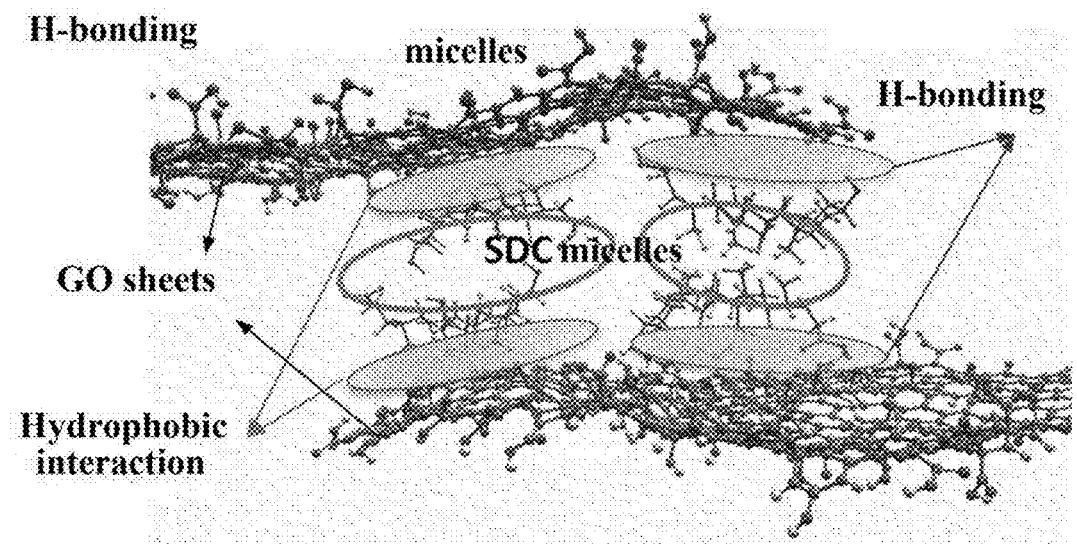

[Fig. 4]
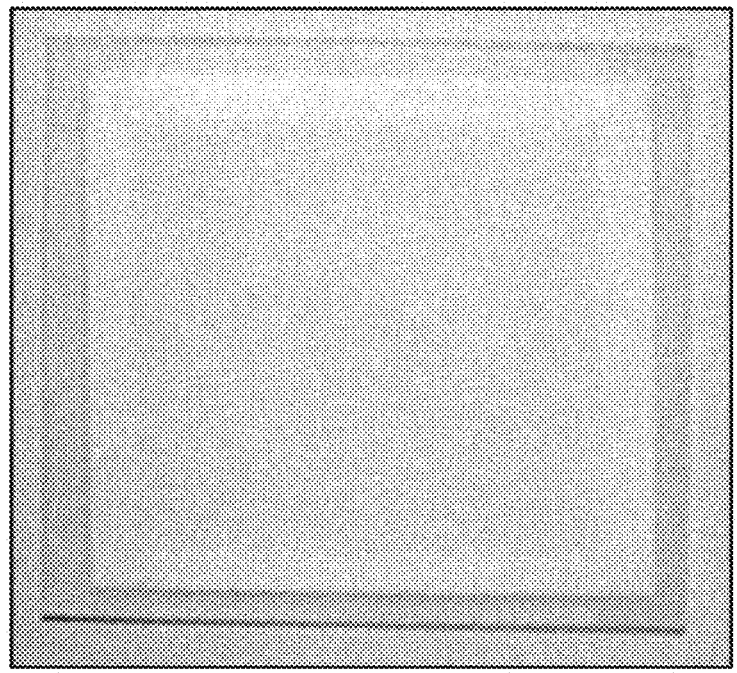
[Fig. 5]
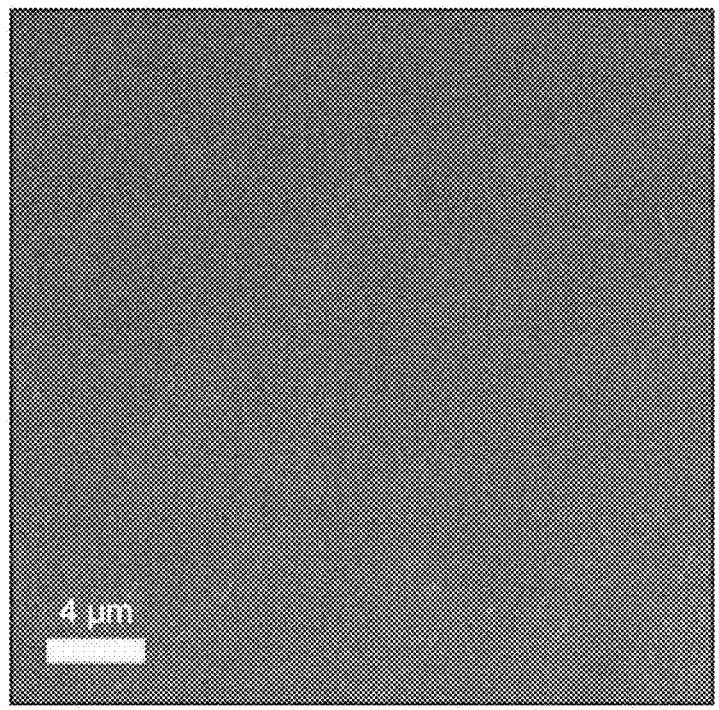

[Fig. 6]
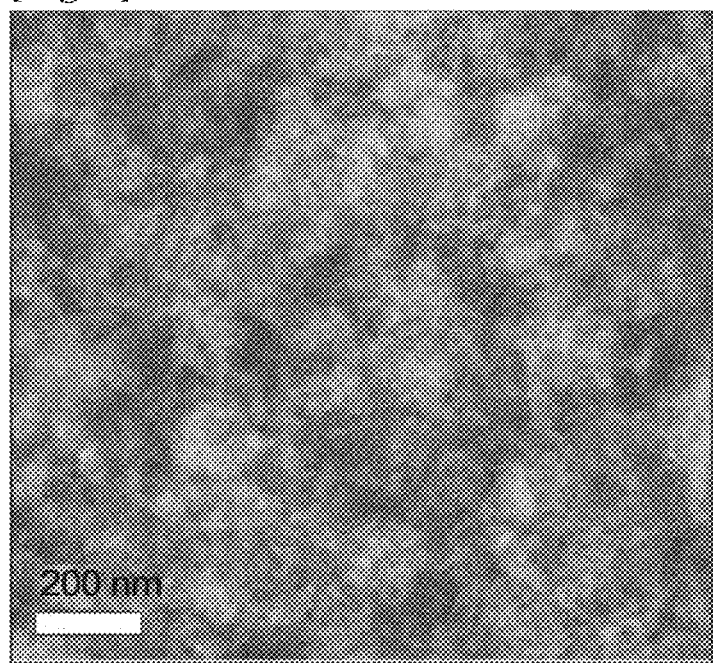
[Fig. 7]
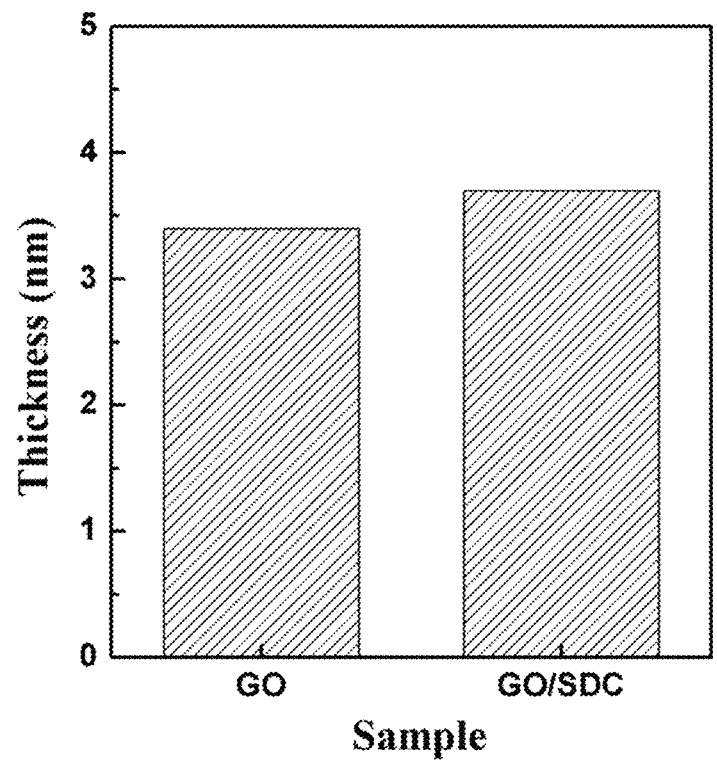

[Fig. 8]
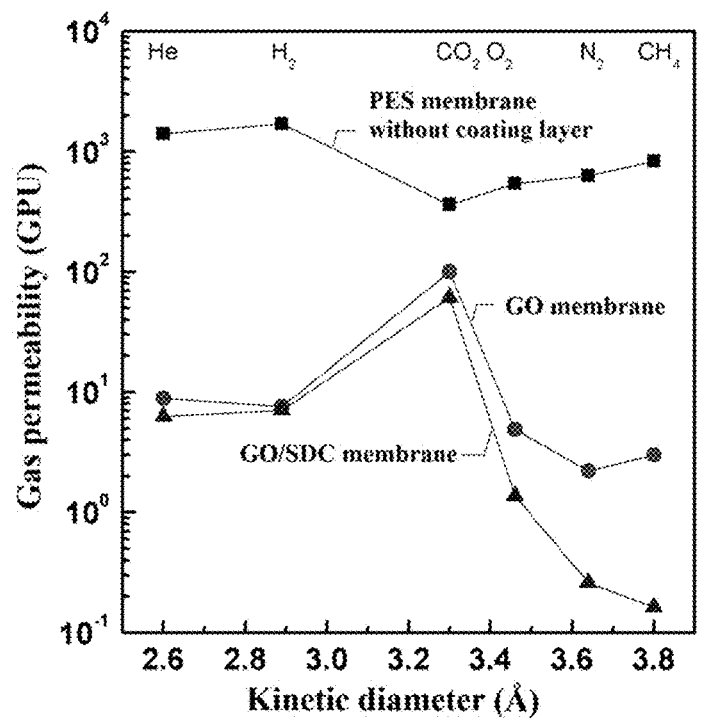
[Fig. 9]
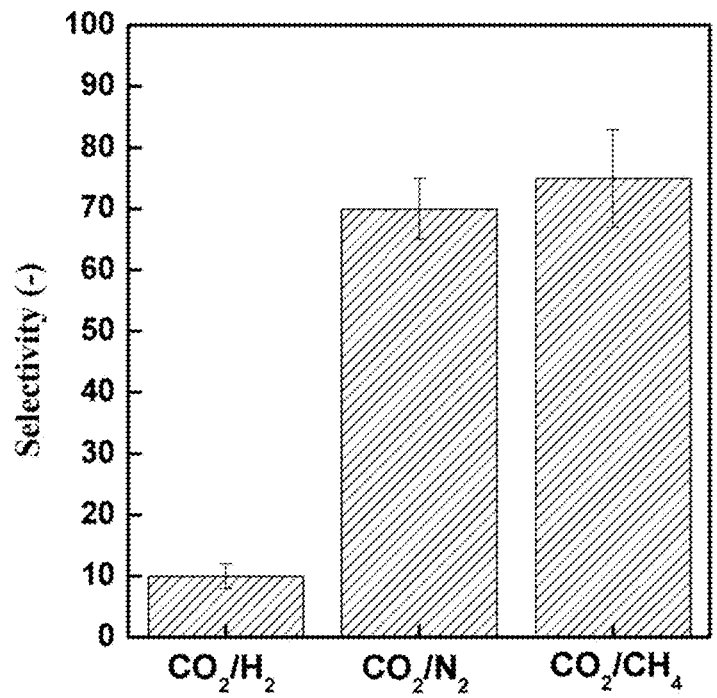

[Fig. 10]
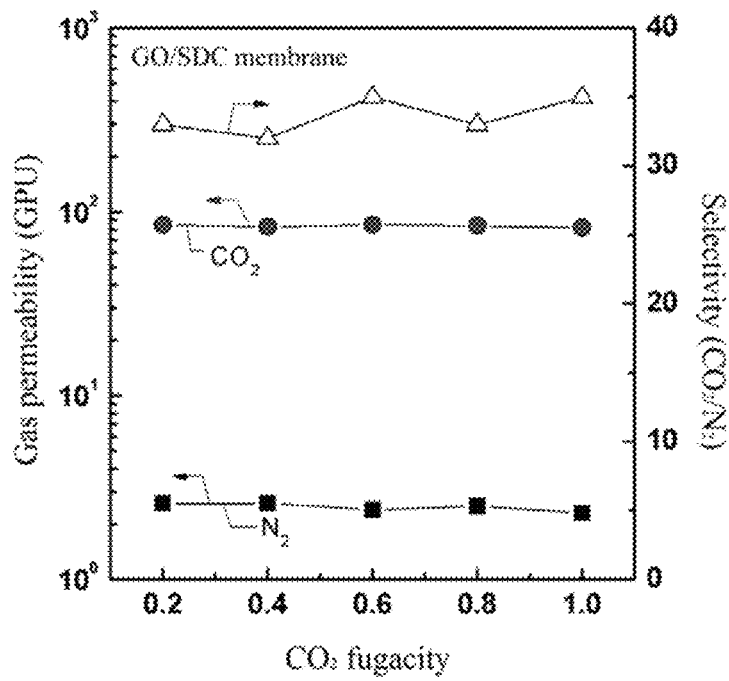
[Fig. 11]
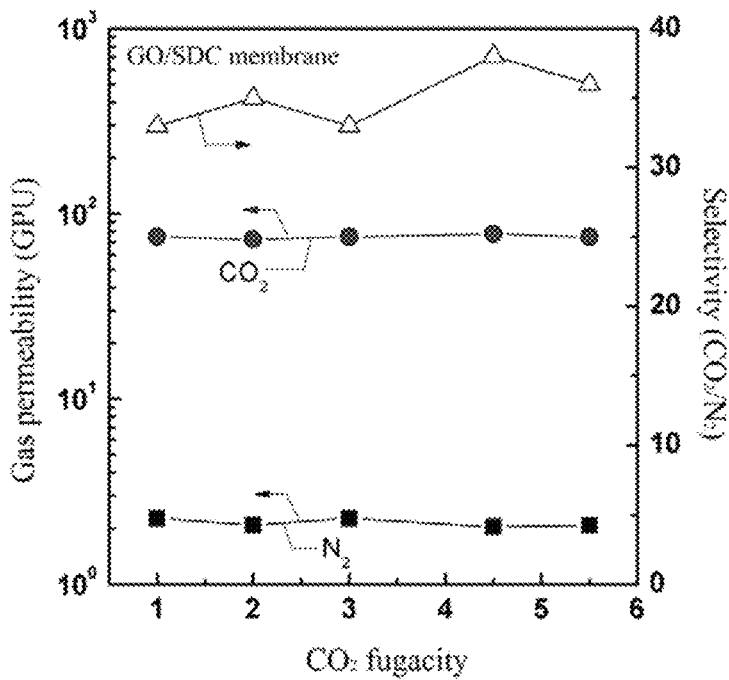

[Fig. 12]
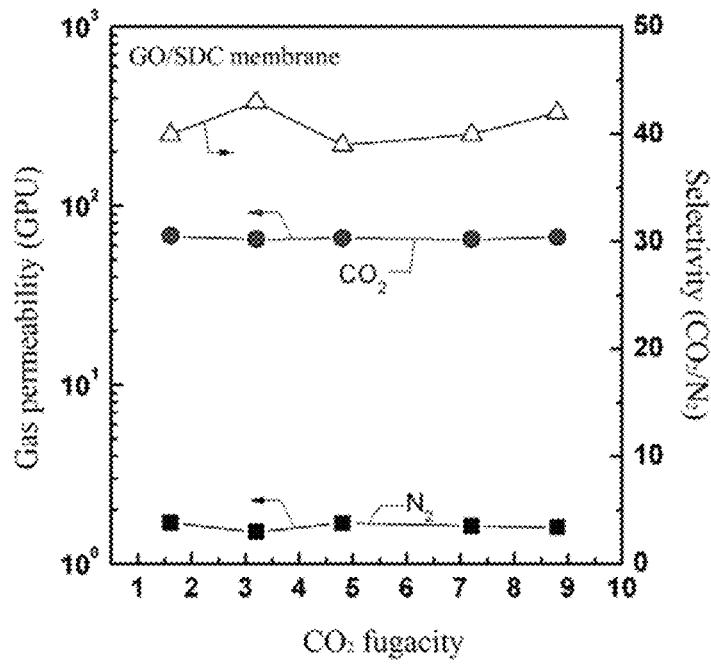
[Fig. 13]
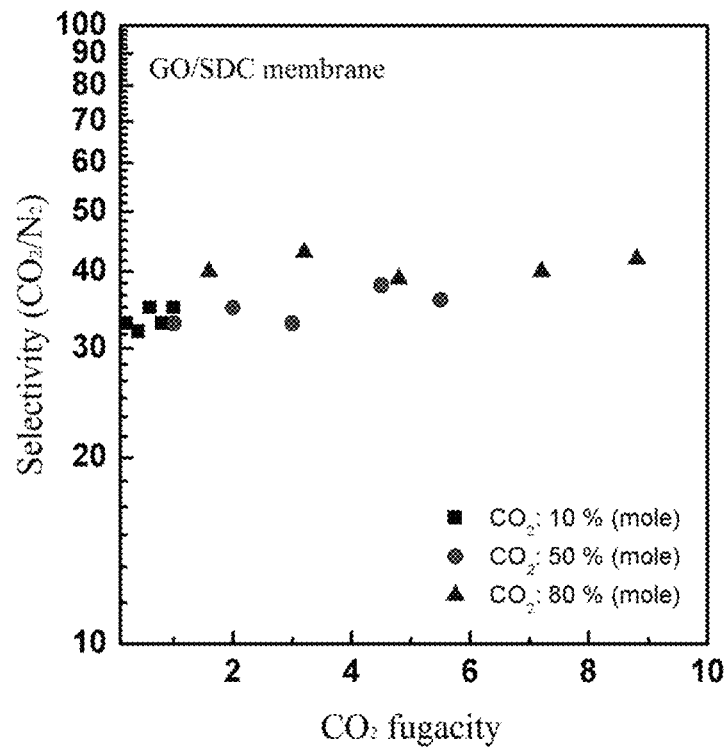

COMPOSITE SEPARATION MEMBRANE INCLUDING COATING LAYER OF GRAPHENE OXIDE/BILE ACID OR SALT THEREOF AND METHOD FOR MANUFACTURING THE SAME

CROSS-REFERENCE TO RELATED APPLICATIONS

This application is a §371 national stage entry of International Application No. PCT/KR2013/008697, filed Sep. 27, 2013, which claims priority to South Korean Patent Application No. 10-2013-0042268, filed Apr. 17, 2013, the entire contents of which are incorporated herein by reference.

TECHNICAL FIELD

The present invention relates to a composite separation membrane including a coating layer composed of graphene oxide and a bile acid or its salt, and a method for manufacturing the same. More specifically, the present invention relates to a composite separation membrane including a coating layer composed of graphene oxide and a bile acid or its salt on a porous polymer support that is applicable to carbon dioxide separation and recovery processes, and a method for manufacturing the composite separation membrane.

BACKGROUND ART

Gas separation membranes capable of selective carbon dioxide separation and recovery are currently applied to various processes, such as carbon dioxide capture before and after combustion in thermal power plants, removal of carbon dioxide present in off-gases from petrochemical processes and flue gases after combustion, and natural gas and biogas purification. Particularly, gas separation membranes based on polymeric materials are required to have not only excellent thermal, chemical, and mechanical properties but also high gas permeability and selectivity for their successful applications to practical industries. However, both the gas permeability and selectivity of polymeric material-based separation membranes are generally difficult to maintain at high levels because of their trade-off relationship. Thus, considerable research efforts have been directed to overcoming this difficulty.

Some conventional monolayer membranes are based on glassy polymeric materials having a high attractive force between the polymer chains do not use supports. Film formation processes for the manufacture of the monolayer membranes leave no defects (or pin holes) but the permeability of the monolayer membranes is disadvantageously low. In recent years, carbon membranes have been developed that are manufactured by final carbonization of monolayer membranes based on various polymeric materials. The carbon membranes are generally obtained by carbonization of polymer precursors in the form of films at high temperature. The high-temperature carbonization makes the carbon membranes microporous. The carbon membranes exhibit high gas permeability and selectivity and are advantageous in terms of long-term stability, durability, chemical resistance, and high-temperature stability. However, the mechanical properties (e.g., elasticity and tensile strength) of the carbon membranes are unsatisfactory and the manufacture of the carbon membranes requires a high temperature of 600 to 1,000° C. and a long time, incurring a considerable cost. Poor processability of the carbon membranes resulting from difficulty in thin film formation is an obstacle to the commercialization of the carbon membranes. Another serious problem of the carbon membranes is that defects may be formed during film formation processes. For example, carbon membranes manufactured by carbonization of hollow fiber membranes made of cellulose esters are known to have improved carbon dioxide permeability and selectivity for carbon dioxide over methane gas but are still insufficient in solving the above-mentioned problems, including defect formation, on account of their characteristics (Patent Document 1: Korean Patent Publication No. 2011-0033111).

Since it was reported that carbon nanotube films have high gas permeability and selectivity, unlike traditional monolayer membranes and carbon membranes, considerable research has been conducted on composite membranes in which carbon nanotubes are mixed inside a polymer matrix. For example, a composite membrane for gas separation is known in which single walled carbon nanotubes functionalized with long-chain alkyl amines are mixed inside a polysulfone matrix to facilitate dispersion of the carbon nanotubes in the polymer (Non-Patent Document 1: Sangil Kim et al., J. Membr. Sci. 294 (2007) 147-158). The composite membrane is also known to have improved carbon dioxide permeability compared to polysulfone monolayer membranes. However, the composite membrane exhibits lower selectivity for carbon dioxide over methane gas than polysulfone monolayer membranes, and as a result, the trade-off relationship between the gas permeability and selectivity of the composite membrane still remains unsolved to a satisfactory level.

Recent attention has been paid to graphene materials that have 2-dimensional planar monolayer structures, exhibit high mechanical strength and excellent thermal and chemical properties, and can be formed into thin films. For example, a composite membrane manufactured by the transfer of graphene to a porous polymer support is known (Patent Document 2: U.S. Patent Publication No. 2012-0255899). The use of the graphene-containing composite membrane enables the separation of oxygen from a nitrogen-oxygen mixed gas, leading to oxygen enrichment or nitrogen production. However, despite the expectation that the graphene thin film will improve the gas permeability and selectivity of the composite membrane, the formation of some defects on the membrane surface cannot be avoided, and as a result, the permeability of carbon dioxide is considerably lower than those of other gases, such as helium, hydrogen, oxygen, nitrogen, and methane.

A functionalized graphene-containing composite membrane is known which includes a film layer formed by coating a dispersion of functionalized graphene on an electrically non-conductive porous polymer support by vacuum filtration (Patent Document 3, International Patent Publication No. 2011-066332). The application of the composite membrane to a chemical sensor or an electrochemical double layer capacitor is also known in the patent document. However, the application of the composite membrane to a gas separation membrane is neither suggested nor indicated in the patent document. If the composite membrane is applied to a gas separation membrane, improved carbon dioxide permeability and selectivity will be expected but stability problems encountered in the ultrathin film structure of the coating layer bring about structural deformation of the composite membrane when long-term exposure to a particular gas, such as carbon dioxide, inevitably causing deterioration of permeability and selectivity.

DETAILED DESCRIPTION OF THE INVENTION

Problems to be Solved by the Invention

The present invention has been made in view of the above problems and an object of the present invention is to provide a composite separation membrane including a coating layer composed of graphene oxide and a bile acid or its salt that has both high carbon dioxide permeability and high selectivity for carbon dioxide over nitrogen, hydrogen or methane gas, is free of surface defects, and maintains a stable structure without deterioration of its performance even after long-term use, and a method for manufacturing the composite separation membrane.

Means for Solving the Problems

An aspect of the present invention provides a composite separation membrane including a porous polymer support and a coating layer formed on the porous polymer support wherein the coating layer is composed of graphene oxide and a bile acid or its salt.

The porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

The porous polymer support has a pore size in the range of 10 nm to 100 nm.

The graphene oxide has a size in the range of 0.1 µm to 5 µm.

The graphene oxide is functionalized graphene oxide prepared by the conversion of the hydroxyl, carboxyl, carbonyl or epoxy groups present in the graphene oxide to ester, ether, amide or amino groups.

The bile acid or its salt is selected from the group consisting of cholic acid, glycocholic acid, taurocholic acid, lithocholic acid, deoxycholic acid, chenodeoxycholic acid, mixtures thereof, and sodium salts thereof.

The coating layer includes a monolayer or multilayer structure of the graphene oxide.

The monolayer graphene oxide has a thickness in the range of 0.6 nm to 1 nm.

The coating layer is an ultrathin film having a thickness in the range of 1 nm to 10 nm.

The present invention also provides a method for manufacturing a composite separation membrane, including: i) dispersing graphene oxide in distilled water to obtain a dispersion; ii) adding a bile acid or its salt to the dispersion and stirring the mixture at 25 to 60° C. for 30 min or more to obtain a mixed solution; and iii) coating the mixed solution on a porous polymer support to form a coating layer.

The graphene oxide has a size in the range of 0.1 µm to 5 µm.

The graphene oxide is functionalized graphene oxide prepared by the conversion of the hydroxyl, carboxyl, carbonyl or epoxy groups present in the graphene oxide to ester, ether, amide or amino groups.

The dispersion is an aqueous solution of 0.01 to 0.5% by weight of the graphene oxide whose pH is adjusted to 2.0 to 12.0 with a 1 M aqueous solution of sodium hydroxide.

The bile acid or its salt is selected from the group consisting of cholic acid, glycocholic acid, taurocholic acid, lithocholic acid, deoxycholic acid, chenodeoxycholic acid, mixtures thereof, and sodium salts thereof.

The bile acid or its salt is added at a concentration of 0.01 to 5% by weight.

The porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

The porous polymer support has a pore size in the range of 10 nm to 100 nm.

The coating is performed by a process selected from the group consisting of direct evaporation, transfer, spin coating, and spray coating.

The spin coating is repeated between 3 and 10 times.

The coating layer includes a monolayer or multilayer structure of the graphene oxide.

The monolayer graphene oxide has a thickness in the range of 0.6 nm to 1 nm.

The coating layer is an ultrathin film having a thickness in the range of 1 nm to 10 nm.

Effects of the Invention

The composite separation membrane of the present invention, which includes a coating layer composed of graphene oxide and a bile acid or its salt, has both high carbon dioxide permeability and high selectivity for carbon dioxide over nitrogen, hydrogen or methane gas, is free of surface defects, and maintains a stable structure without deterioration of its performance even after long-term use. Due to these advantages, the composite separation membrane of the present invention can be applied to industrial fields involving carbon dioxide separation and recovery processes.

BRIEF DESCRIPTION OF THE DRAWINGS

FIG. 1 shows the structures of graphene oxide and functionalized graphene oxide.

FIG. 2 shows the planar and steric chemical structures of sodium deoxycholate.

FIG. 3 shows a predicted structure in which sodium deoxycholate micelles are bound to graphene oxide.

FIG. 4 is an image of a composite separation membrane manufactured in Example 1.

FIG. 5 is a scanning electron microscopy image showing the surface of a composite separation membrane manufactured in Example 1.

FIG. 6 is a scanning probe microscopy image showing the surface of a composite separation membrane manufactured in Example 1.

FIG. 7 is a graph showing the effective coating thickness of a composite separation membrane manufactured in Example 1, as measured by ellipsometry.

FIG. 8 is a graph showing the gas permeability tendencies of a porous support PES membrane without a coating layer, a composite membrane including a graphene oxide coating layer formed on a PES film, and a composite separation membrane manufactured in Example 1, which includes a graphene oxide/sodium deoxycholate coating layer.

FIG. 9 is a graph showing the selectivities of a composite separation membrane manufactured in Example 1 for carbon dioxide over hydrogen, nitrogen, and methane gas.

FIG. 10 is a graph showing the carbon dioxide and nitrogen permeabilities of a composite separation membrane manufactured in Example 1 and the selectivities of the composite separation membrane for carbon dioxide over nitrogen at different partial pressures of carbon dioxide from a carbon dioxide (10 mole %)/nitrogen (90 mole %) mixed gas.

FIG. 11 is a graph showing the carbon dioxide and nitrogen permeabilities of a composite separation membrane manufactured in Example 1 and the selectivities of the composite separation membrane for carbon dioxide over nitrogen at different partial pressures of carbon dioxide from a carbon dioxide (50 mole %)/nitrogen (50 mole %) mixed gas.

FIG. 12 is a graph showing the carbon dioxide and nitrogen permeabilities of a composite separation membrane manufactured in Example 1 and the selectivities of the composite separation membrane for carbon dioxide over nitrogen at different partial pressures of carbon dioxide from a carbon dioxide (80 mole %)/nitrogen (20 mole %) mixed gas.

FIG. 13 is a graph showing the selectivities of a composite separation membrane manufactured in Example 1 for carbon dioxide over nitrogen at different partial pressures of carbon dioxide and different concentrations of carbon dioxide in carbon dioxide/nitrogen mixed gases.

BEST MODE FOR CARRYING OUT THE INVENTION

The present invention will now be described in detail with reference to the accompanying drawings. The present invention provides a composite separation membrane including a coating layer composed of graphene oxide and a bile acid or its salt on a porous polymer support and a method for manufacturing the composite separation membrane.

General gas separation membranes have an asymmetric structure consisting of a dense selective separation layer as a surface layer and an underlying porous support with minimum permeation resistance. This structure is advantageous from the viewpoint of selective gas separation, recovery, and concentration. The separation layer should be free of surface defects and be formed as thin as possible for high gas permeability. For these reasons, most gas separation membranes are in the form of composite membranes including a coating layer formed on a porous polymer support. Further, gas separation membranes are preferably in the form of composite membranes with high mechanical strength and excellent thermal and chemical properties taking into consideration their performance and long-term operation. In view of the foregoing, the composite membrane of the present invention uses a porous polymer support.

The porous polymer support can function as a reinforcing material to support an overlying coating layer. The porous polymer support is in contact with the coating layer and is made of a polymeric material having pores whose size is large enough for a gas to penetrate therethrough. Specifically, the porous polymer support is made of a polymer selected from the group consisting of, but not limited to, polysulfone, polyethersulfone, polyimide, polyetherimide, polyamide, polyacrylonitrile, cellulose acetate, cellulose triacetate, and polyvinylidene fluoride. Polyethersulfone is more preferred as a material for the support.

Preferably, the porous polymer support is microporous with a pore size in the range of 10 nm to 100 nm. Within this range, gas permeation resistance at the bottom of the separation membrane can be minimized and the overall permeability of the composite membrane can be improved by controlling the surface porosity and bulk porosity of the polymer support.

Next, a detailed description will be given concerning the coating layer formed on the porous polymer support. The coating layer is composed of graphene oxide and a bile acid or its salt.

Graphene oxide can be prepared on a large scale by oxidizing graphite with as an oxidizing agent and includes hydrophilic functional groups, such as hydroxyl, carboxyl, carbonyl or epoxy groups. The majority of graphene oxide is currently prepared by the Hummers method [Hummers, W. S. & Offeman, R. E. Preparation of graphite oxide. *J. Am. Chem. Soc.* 80. 1339(1958)] or its partially modified Hummers methods. Graphene oxide obtained by a modified Hummers method is used in the present invention. The gas permeability of the coating layer can be controlled by varying the size of the graphene oxide. If the graphene oxide is larger in size than 5 μm, the coating layer exhibits barrier properties. In contrast, as the size of the graphene oxide decreases from 5 μm to 0.1 μm, the gas permeability of the coating layer is gradually increased to a level suitable for gas separation. Thus, the size of the graphene oxide is preferably adjusted to the range of 0.1 μm to 5 μm, more preferably 0.3 μm to 1 μm.

In the present invention, functionalized graphene oxide may also be used. The functionalized graphene oxide can be prepared by chemical reaction of the graphene oxide with another compound to convert the hydrophilic functional groups present in the graphene oxide, such as hydroxyl, carboxyl, carbonyl or epoxy groups, to ester, ether, amide or amino groups. For example, the carboxyl groups of the graphene oxide may be converted to ester groups by reaction of the graphene oxide with an alcohol, the hydroxyl groups of the graphene oxide may be converted to ether groups by reaction of the graphene oxide with an alkyl halide, the carboxyl groups of the graphene oxide may be converted to amide groups by reaction of the graphene oxide with an alkyl amine, or the epoxy groups of the graphene oxide may be converted to amino groups by ring-opening reaction of the graphene oxide with an alkyl amine. FIG. 1 shows the structures of graphene oxide prepared from graphite by the Hummers method and functionalized graphene oxide prepared by reaction of the graphene oxide with another compound.

On the other hand, the coating layer formed on the porous polymer support is composed of graphene oxide and a bile acid or its salt. The bile acid salt acts as a surfactant but has a structure consisting of a hydrophobic side and a hydrophilic side, unlike general surfactants. Due to this unique structure, the bile acid salt is known to have a critical micelle concentration over a broad range from 10 mM to 300 mM. Specific examples of such bile acids or salts thereof include cholic acid, glycocholic acid, taurocholic acid, lithocholic acid, deoxycholic acid, chenodeoxycholic acid, and sodium salts thereof. FIG. 2 shows the structures of sodium deoxycholate as the bile acid salt.

As the bile acid or its salt, there may be used an acid selected from the group consisting of cholic acid, glycocholic acid, taurocholic acid, lithocholic acid, deoxycholic acid, and chenodeoxycholic acid or its sodium salt. Particularly, sodium deoxycholate structurally similar to graphene oxide is more preferably used because when sodium deoxycholate is added to a solution of the graphene oxide, it is hydrogen bonded and interacts hydrophobically with the graphene oxide to form a stable structure. FIG. 3 shows a structure in which sodium deoxycholate micelles are bound to graphene oxide.

The coating layer includes a monolayer or multilayer structure of the graphene oxide. The monolayer graphene oxide has a thickness in the range of 0.6 nm to 1 nm. The multilayer graphene oxide may be formed by laminating a plurality of monolayer graphene oxide sheets. The interlayer spacing between the graphene oxide sheets is as small as about 0.34 nm to about 0.5 nm. As a result, additional migration paths are formed between the grain boundaries and the separation selectivity of the coating layer for a particular substance can be improved by controlling the pore and channel sizes of the gaps between the grain boundaries. The multilayer graphene oxide can increase the ratio of the penetration rates of two substances to be separated because it increases the diffusion path lengths of the substances. Accordingly, an increase in the number of graphene oxide layers in the multilayer graphene oxide leads to an increase in the selectivity of the multilayer graphene oxide. Thus, it is more preferred that the coating layer includes a multilayer structure of graphene oxide.

The present invention also provides a method for manufacturing a composite separation membrane, including: i) dispersing graphene oxide in distilled water to obtain a dispersion; ii) adding a bile acid or its salt to the dispersion and stirring the mixture at 25 to 60° C. for 30 min or more to obtain a mixed solution; and iii) coating the mixed solution on a porous polymer support to form a coating layer.

Preferably, the graphene oxide used in step i) has a size in the range of 0.1 µm to 5 µm. Within this range, improved gas permeability is achieved.

The graphene oxide used in step i) may also be functionalized graphene oxide prepared by the conversion of the hydroxyl, carboxyl, carbonyl or epoxy groups present in the graphene oxide to ester, ether, amide or amino groups.

The dispersion obtained in step i) is an aqueous solution of 0.01 to 0.5% by weight of the graphene oxide whose pH is adjusted to 2.0 to 12.0 with a 1 M aqueous solution of sodium hydroxide. If the concentration of the graphene oxide in the aqueous solution is less than 0.01% by weight, a uniform coating layer is difficult to obtain. Meanwhile, if the concentration of the graphene oxide in the aqueous solution exceeds 0.5% by weight, the aqueous solution is too viscous, making the subsequent coating step difficult to carry out. It is thus preferred to adjust the concentration of the graphene oxide in the aqueous solution to 0.01 to 0.5% by weight.

The bile acid or its salt used in step ii) is preferably selected from the group consisting of cholic acid, glycocholic acid, taurocholic acid, lithocholic acid, deoxycholic acid, chenodeoxycholic acid, mixtures thereof, and sodium salts thereof. The concentration of the bile acid or its salt is preferably from 0.01 to 5% weight. If the bile acid or its salt is added at a concentration of less than 0.01% by weight, it is difficult to expect a stable structure through hydrogen bonding and hydrophobic interaction with the graphene oxide. Meanwhile, if the bile acid or its salt is added at a concentration exceeding 5% by weight, the mixed solution is too viscous, making the subsequent coating step difficult to carry out.

The porous polymer support used in step iii) is made of a polymer selected from the group consisting of polysulfone, polyethersulfone, polyimide, polyetherimide, polyamide, polyacrylonitrile, cellulose acetate, cellulose triacetate, and polyvinylidene fluoride. Preferably, the porous polymer support has a pore size in the range of 10 nm to 100 nm. Within this range, gas permeation resistance at the bottom of the separation membrane can be minimized.

In step iii), any suitable process known in the art may be used to form the coating layer. Preferably, the coating is performed by a process selected from the group consisting of direct evaporation, transfer, spin coating, and spray coating. More preferred is spin coating by which a uniform coating layer can be obtained in a simple manner.

The spin coating is preferably repeated between 3 and 10 times. If the number of times of the spin coating is less than 3, the function of the coating layer as a selective separation layer is difficult to expect. Meanwhile, if the number of times of the spin coating exceeds 10, the coating layer is too thick, resulting in considerable deterioration of permeability.

The coating layer formed in step iii) may include a monolayer or multilayer structure of the graphene oxide. The monolayer graphene oxide has a thickness in the range of 0.6 nm to 1 nm.

MODE FOR CARRYING OUT THE INVENTION

The present invention will be explained in detail with reference to the following examples.

Example 1

0.1 wt % of graphene oxide prepared by a modified Hummers method was dispersed in water using an ultrasonic homogenizer. The pH of the dispersion was adjusted to 10.0 with 0.1 wt % of a 1 M aqueous solution of sodium hydroxide. To the graphene oxide dispersion was added 0.1 wt % of sodium deoxycholate. The mixture was stirred at 40° C. for 3 h to obtain a homogeneous mixed solution. 1 mL of the mixed solution was spin coated 5 times on a polyethersulfone (PES) support to form a coating layer composed of graphene oxide and sodium deoxycholate, completing the manufacture of a composite separation membrane.

Measurement Examples

An image of the composite separation membrane manufactured in Example 1 was taken with a camera and the coating layer was observed using a scanning electron microscope (SEM) and a scanning probe microscope (AFM). A coating layer was formed on a silicon wafer by the same procedure as in Example 1 and the thickness of the coating layer was measured by ellipsometry.

Test Examples

The gas permeability and selectivity of the composite separation membrane manufactured in Example 1 were measured by a constant pressure/variable volume method.

The image of the composite separation membrane shown in FIG. 4 reveals the formation of the coating layer composed of graphene oxide and sodium deoxycholate on the porous polyethersulfone support.

FIGS. 5 and 6 are a scanning electron microscopy image and a scanning probe microscopy image showing the surface of the composite separation membrane manufactured in Example 1, respectively. The images reveal that the coating layer composed of graphene oxide and sodium deoxycholate was uniformly coated on the polyethersulfone porous support, leaving no defects on the surface.

It can be seen from FIG. 7 that the coating layer (GO/SDC) composed of graphene oxide (GO) and sodium deoxycholate (SDC) on the polyethersulfone porous support had a thickness as ultrathin as about 3.7 nm. Composite separation membranes were manufactured in the same manner as in Example 1, except that the number of times of the spin coating was changed to 3, 4, and 6 to 10. As a result, most of the coating layers were measured to have thicknesses in the range of 1-10 nm, demonstrating that the ultrathin coating layers composed of graphene oxide and sodium deoxycholate were stably formed. The stable structures of the coating layers attributed to hydrogen bonding and hydrophobic interaction between graphene oxide and sodium deoxycholate prevents the separation performance of the composite separation membranes from deteriorating even after long-term use.

FIG. 8 is a graph showing the gas permeability tendencies of a porous PES membrane without a coating layer, a composite membrane including a graphene oxide coating layer formed on a PES film, and the composite separation membrane manufactured in Example 1, which includes a graphene oxide/sodium deoxycholate coating layer. As expected, the permeabilities of the composite separation membranes including coating layers tended to be lower for most gases than those of the porous PES membrane without a coating layer (FIG. 8). On the other hand, the permeability of carbon dioxide through the porous PES membrane without a coating layer was lower than the permeabilities of helium, hydrogen, oxygen, nitrogen, and methane gas. In contrast, the permeability of carbon dioxide through the composite separation membrane (GO/SDC membrane) was much higher than the permeabilities of the other gases. As shown in FIG. 9, the selectivities of the composite separation membrane manufactured in Example 1 for carbon dioxide over nitrogen and methane gas were as high as 70 to 80.

Particularly, the graphs of FIGS. 10-13 reveal that the composite separation membrane manufactured in Example 1 showed very high carbon dioxide permeabilities and very high selectivities for carbon dioxide over nitrogen at different partial pressures of carbon dioxide from carbon dioxide/nitrogen mixed gases. The same experiments were conducted on a hydrogen/carbon dioxide mixed gas and a methane gas/carbon dioxide mixed gas. As a result, the composite separation membrane manufactured in Example 1 was confirmed to have high selectivities for carbon dioxide.

The composite separation membrane of the present invention, which includes a coating layer composed of graphene oxide and a bile acid or its salt on a porous polymer support, is free of surface defects and maintains a stable structure without deterioration of its performance even after long-term use. Due to these advantages, the composite separation membrane of the present invention is expected to be applicable to carbon dioxide separation processes in practical industrial fields.

The invention claimed is:

1. A composite separation membrane comprising a porous polymer support and a coating layer formed on the porous polymer support wherein the coating layer is composed of graphene oxide and a bile acid or its salt.

2. The composite separation membrane according to claim 1, wherein the porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

3. The composite separation membrane according to claim 1, wherein the porous polymer support has a pore size in the range of 10 nm to 100 nm.

4. The composite separation membrane according to claim 1, wherein the graphene oxide has a size in the range of 0.1 µm to 5 µm.

5. The composite separation membrane according to claim 1, wherein the graphene oxide is functionalized graphene oxide prepared by the conversion of the hydroxyl, carboxyl, carbonyl or epoxy groups present in the graphene oxide to ester, ether, amide or amino groups.

6. The composite separation membrane according to claim 1, wherein the bile acid or its salt is selected from the group consisting of cholic acid, glycocholic acid, taurocholic acid, lithocholic acid, deoxycholic acid, chenodeoxycholic acid, mixtures thereof, and sodium salts thereof.

7. The composite separation membrane according to claim 1, wherein the coating layer comprises a monolayer or multilayer structure of the graphene oxide.

8. The composite separation membrane according to claim 7, wherein the monolayer graphene oxide has a thickness in the range of 0.6 nm to 1 nm.

9. The composite separation membrane according to claim 1, wherein the coating layer is an ultrathin film having a thickness in the range of 1 nm to 10 nm.

10. A method for manufacturing a composite separation membrane, comprising: i) dispersing graphene oxide in distilled water to obtain a dispersion; ii) adding a bile acid or its salt to the dispersion and stirring the mixture at 25 to 60° C. for 30 min or more to obtain a mixed solution; and iii) coating the mixed solution on a porous polymer support to form a coating layer.

11. The method according to claim 10, wherein the graphene oxide has a size in the range of 0.1 µm to 5 µm.

12. The method according to claim 10, wherein the graphene oxide is functionalized graphene oxide prepared by the conversion of the hydroxyl, carboxyl, carbonyl or epoxy groups present in the graphene oxide to ester, ether, amide or amino groups.

13. The method according to claim 10, wherein the dispersion is an aqueous solution of 0.01 to 0.5% by weight of the graphene oxide whose pH is adjusted to 2.0 to 12.0 with a 1 M aqueous solution of sodium hydroxide.

14. The method according to claim 10, wherein the bile acid or its salt is selected from the group consisting of cholic acid, glycocholic acid, taurocholic acid, lithocholic acid, deoxycholic acid, chenodeoxycholic acid, mixtures thereof, and sodium salts thereof.

15. The method according to claim 10, wherein the bile acid or its salt is added at a concentration of 0.01 to 5% by weight.

16. The method according to claim 10, wherein the porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

17. The method according to claim 10, wherein the porous polymer support has a pore size in the range of 10 nm to 100 nm.

18. The method according to claim 10, wherein the coating is performed by a process selected from the group consisting of direct evaporation, transfer, spin coating, and spray coating.

19. The method according to claim 18, wherein the spin coating is repeated between 3 and 10 times.

20. The method according to claim 10, wherein the coating layer comprises a monolayer or multilayer structure of the graphene oxide.

21. The method according to claim 20, wherein the monolayer graphene oxide has a thickness in the range of 0.6 nm to 1 nm.

22. The method according to claim 10, wherein the coating layer is an ultrathin film having a thickness in the range of 1 nm to 10 nm.

* * * * *

UNITED STATES PATENT AND TRADEMARK OFFICE
CERTIFICATE OF CORRECTION

PATENT NO.         : 9,833,749 B2
APPLICATION NO.    : 14/785474
DATED              : December 5, 2017
INVENTOR(S)        : Ho Bum Park et al.

It is certified that error appears in the above-identified patent and that said Letters Patent is hereby corrected as shown below:

On the Title Page

Item [30] Under Foreign Application Priority Data, delete "September 20, 2013" and insert -- April 17, 2013 -- in place thereof.

Signed and Sealed this
Third Day of April, 2018

Andrei Iancu
*Director of the United States Patent and Trademark Office*